United States Patent [19]
D'Amico

[11] 3,975,027
[45] Aug. 17, 1976

[54] FACE SEAL

[75] Inventor: James J. D'Amico, Painesville, Ohio

[73] Assignee: Flex, Incorporated, Mentor, Ohio

[22] Filed: July 18, 1975

[21] Appl. No.: 597,072

[52] U.S. Cl. .................................................. 277/84
[51] Int. Cl.² ........................................... F16J 15/34
[58] Field of Search ................................ 277/81–96

[56] References Cited
UNITED STATES PATENTS

| | | | |
|---|---|---|---|
| 3,331,609 | 7/1967 | Moran | 277/84 |
| 3,511,511 | 5/1970 | Voitik | 277/84 |

*Primary Examiner*—Robert I. Smith
*Attorney, Agent, or Firm*—Bosworth, Sessions & McCoy

[57] ABSTRACT

A lubricant retaining face seal useful, for example, in a pivoting mechanical connection, and having a flexible compressible annular sealing lip comprising a conical sealing surface to provide significant annular area of sealing engagement between seal and mating surface. A modified form includes an O-ring around the sealing lip to insure sealing under light loads and to overcome compression set of the lip.

10 Claims, 5 Drawing Figures

FACE SEAL

BACKGROUND OF THE INVENTION

Pivoting or swinging connection between elements of mechanical linkage are widely used in machines. A pin fitted through tie rod eyes or bosses is an example of such a connection. To insure the free and easy movement of such connections, they must be provided with a lubricant such as grease between the relatively moving surfaces of the connection. The lubricant must be retained between the contacting surfaces of the connection to be effective in reducing friction and wear between the elements of the connection.

SUMMARY OF THE INVENTION

This invention relates to a face seal for retaining grease between the engaged surfaces in a pivoting connection such as a pin and the eye in the end of a tie rod. In particular, it relates to a thin, annular and disc-like seal that surrounds the pin and has grease retaining and sealing engagement over a significant annular area of surface of the face or sealing surface of an eye in a tie rod end, for example. The sealing surface of the eye is the annular area surrounding the pin opening and lying in a plane generally normal to the axis of the pin of the connection.

The large area of sealing engagement provided by the seal of this invention is maintained in spite of varied and changing dimensional relationships in the structure of the connection by an annular lip of novel design extending generally axially from the radially outer portion or periphery of one side of the seal. The radially inner side of the lip is defined by a conical surface which is inclined more than about 20° to the sealing surface of the eye when the seal is in place around the pin in the eye, but out of engagement with the sealing surface of the eye. When the seal is in sealing position on the pin and against the eye, the lip flexes radially outwardly and compresses axially, and the conical surface of the seal lip is urged into sealing engagement over a significant annular area of the sealing surface of said eye.

The central portion of the disc-like seal preferably has parallel planar surfaces for engagement by a back-up plate or shim on one side and the sealing surface of the eye on the other. Obviously, the surfaces of the central portion can be other than planar and parallel, depending upon the configuration of their mating surfaces in the structure of the connection.

The invention also comprehends a face seal as described generally above together with a circumferential tension member such as an elastic O-ring fitted in a groove around the annular lip and tending to urge the lip and particularly its conical sealing surface into sealing engagement when in place. This modification is especially useful to insure relatively high sealing pressures when dimensional differences in the structure of the connection and compression set deformations of the sealing lip might otherwise impair the seal's sealing engagement.

The seal of this invention is very broadly of the general class which includes a thrust washer seal used in the universal joint construction disclosed in U.S. Pat. No. 3,650,123. The invention herein disclosed and claimed differs significantly, however, both in structure and operation from anything shown or suggested by that seal. The sealing element of the seal herein disclosed comprises in its free state a conical sealing surface which is angularly related to the sealing surface with which it is intended to mate and have sealing engagement. The sealing element is flexible and elastic so that it flexes and compresses when in place and sealing engagement to provide a relatively large annular area of sealing contact between the conical surface of the lip and its mating surface. In addition, this invention comprehends the novel use of an O-ring, for example, to aid the element in sealing under certain circumstances.

The seal of U.S. Pat. No. 3,650,123 is both a thrust washer and a seal for retaining grease comprising a sealing element having a flat narrow sealing surface parallel to its mating surface when the seal is in its free state. Upon engagement of the sealing element or lip of the seal and its mating surface, only a sharp line contact engagement is developed with little or no significant surface area engagement. This follows from the structure of the annular sealing element. The engagement of the sharp edge of the thrust washer seal's circumferential lip produces high unit pressures so that the hard lip tends to wear a groove in the surface with which it mates. The seal is based upon a different theory and concept of sealing engagement from that of this invention and one not well adapted if not unable, for example, to accommodate dimensional variations and misalignments between mating surfaces in the manner of the seal of this invention. This seal of the '123 patent does a different job in a different way from the seal of this invention.

DESCRIPTION OF THE PREFERRED EMBODIMENTS

Figure 1:
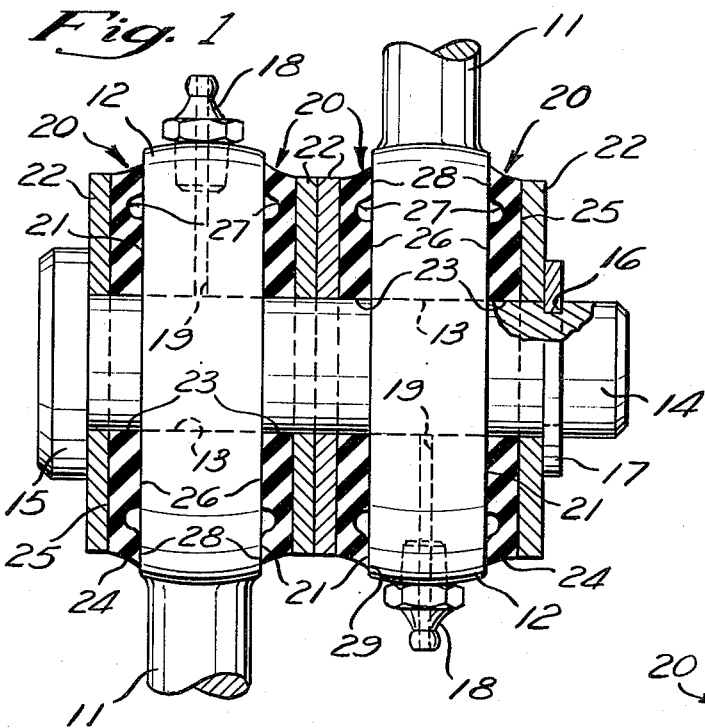
FIG. 1 is a partially sectioned, side elevational view of a tie rod connection including seals embodying this invention.

A preferred form of face seal embodying this invention is shown in FIG. 1 in place and functioning in a pivoting mechanical connection. The connection comprises a pair of tie rods 11 terminating in eyes 12. The openings 13 of the eyes 12 are axially aligned to receive connecting pin 14. Pin 14 has an enlarged head 15 and a groove 16 near its opposite end to receive snap ring 17.

Eyes 12 are each fitted with conventional grease fittings 18 which enable lubricant to be introduced through internal passages 19 into the inside of openings 13. The grease is retained in the connection by seals indicated generally by the reference numeral 20, in FIGS. 1, 2 and 3. Each seal 20 faces a sealing surface 21 of an eye 12 and is backed by a stiff shim or plate 22.

Figure 2:
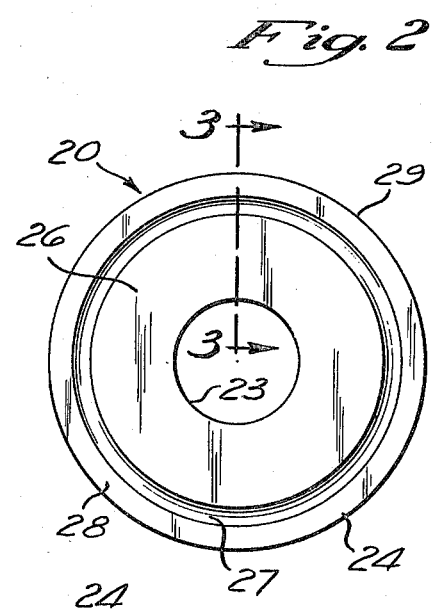
FIG. 2 is a plan view of the face seal of the invention.
Figure 3:
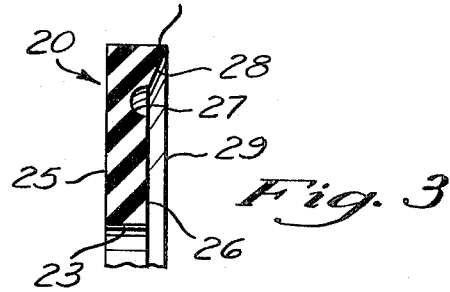
FIG. 3 is a sectional view taken in the plane 3—3 of FIG. 2.

Seal 20 in its free state as shown in FIGS. 2 and 3 is a relatively thin disc-like component having a central opening 23 for receiving the shank of pin 14 with a slight interference fit. An annular lip 24 spaced radially outwardly from and surrounding opening 23 extends axially from the periphery of the seal. The central portion of the seal is bounded by two faces 25 and 26 which in the preferred embodiment are planar and parallel. Adjacent lip 24 is a narrow annular area of reduced thickness or relief groove 27 which reduces the resistance to flexing of lip 24.

Lip 24 of seal 20 is characterized by a conical surface 28 angularly related to its intended mating sealing surface 21 on an eye 12. In a preferred embodiment, conical surface 28 is inclined to its mating surface by an angle of 28° or to the axis of the seal by an angle of 62°. It is believed that the angle of inclination to the mating surface should be at least about 20° to achieve the theory of sealing comprehended by this invention.

Lip 24 extends axially outwardly of the plane of central portion face 26. In a preferred embodiment of the seal, lip 24 extends outwardly from the other surfaces of the seal so that its axial extent may be reduced by at least about 15% when fully compressed and flexed in sealing engagement. It may be less when not fully flexed and compressed. Its radial extent is approximately 0.027 inch greater than the 0.125 inch thickness of the central portion of the seal. Thus, in the preferred embodiment, lip 24 has a maximum axial dimension of about 0.152 inch in its free state and 0.125 in its fully compressed and flexed state. The extent of the reduction must be sufficient to place a significant amount of conical surface 28 of lip 24 in sealing engagement. The foregoing specific dimensions are given as an example and are not intended to limit the invention to them.

Lip 24 flexes and compresses when the seal is loaded and in place as shown in FIG. 1 and brings face 26 and conical surface 28 into engagement with sealing surface 21 of eye 12. In particular, conical surface 28 is urged into sealing engagement over a significantly large annular area. Thus even under light loading, as may occur within the normal dimensional tolerances encountered in such a mechanical connection as shown, lip 24 is flexed and compressed so that a substantial area of sealing is achieved and insured. Also any misalignment of tie rods 11 and consequent skewing of eyes 12 as may be permitted by pin diameter and eye opening dimensions is accommodated by the flexing and compressing of the flexible elastic lip 24 and its conical sealing surface 28. As seen clearly in FIG. 1, conical surfaces 28 are brought to bear against sealing surfaces 21 of eyes 12 when face 26 of the seal central portion bottoms on surface 21 of eye 12. The action of lip 24 is such that as its point of greatest axial extent or sharp edge 29 comes into contact with sealing surface 21 of eye 12 it does not maintain line contact but slides radially outwardly and leads conical surface 28 into intimate sealing engagement over an ever increasing area of contact with sealing surface 21. This is readily apparent by comparing FIGS. 1 and 3 showing the lip 24 of seal 20 in its loaded and free states, respectively.

Figure 4:
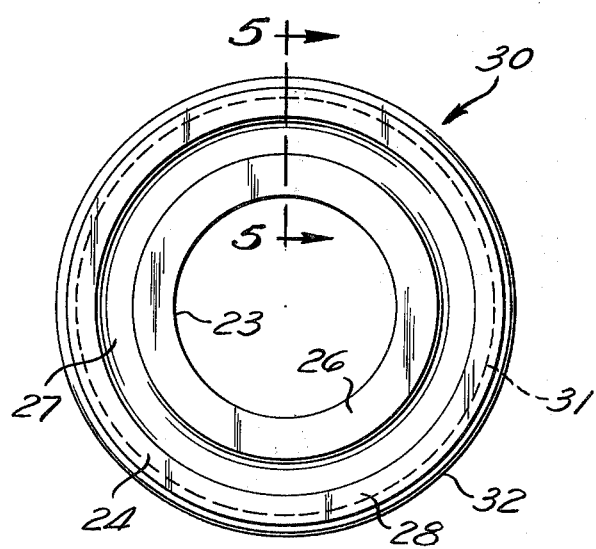
FIG. 4 is a plan view of a modified form of face seal of the invention.
Figure 5:
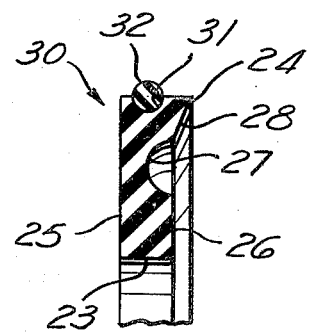
FIG. 5 is a sectional view taken in the plane 5—5 of FIG. 4.

FIGS. 4 and 5 show a modified form of the invention. The seal, indicated generally by numeral 30, is like seal 20 but involves the addition of an outer peripheral groove 31 adapted to receive an elastic tension member such as O-ring 32. Corresponding and like elements of seals 20 and 30 bear the same reference numerals.

The advantage of seal 30 is that the sealing pressures produced by the flexion and compression of lip 24 can be augmented to any extent desired by proper selection of the tension in O-ring 32. O-ring 32 also cooperates to insure against any leaks in the seal due to compression set of lip 24. Otherwise seal 30 embodying this invention functions like seal 20 and as shown in FIG. 1.

It will be apparent that faces 25 and 26 of the central portion of seals 20 and 30 need not be planar and parallel. They need only match their respective mating surfaces of back-up plate 22 and eye 12. These faces and their positive engagement with mating surfaces are important to the operation of the seals. They provide positional stability and allow the lip 24 to move and conform to provide sealing engagement free of any functions related to the location and positioning of the seal in its application.

It will also be understood that the face seal disclosed and claimed herein may be used in other applications than the particular tie rod, pivoting connection shown.

It will be obvious to those skilled in the art to which this invention pertains that various modifications and changes of the preferred embodiment described and shown herein may be made without departing from the spirit and scope of this invention.

I claim:

1. A face seal for retaining lubricant in a mechanical connection comprising a pin and an eye having an annular sealing surface intended for engagement by said seal surrounding a pin-receiving opening, said seal comprising a thin annular body having a central axis and pin-receiving opening and a resiliently flexible annular axially extending lip having a radially inner conical sealing surface inclined to an intended annular sealing surface at a first angle and a radially outer non-sealing surface inclined to the same intended annular sealing surface at a second angle greater than said first, the average inclination of said first and second angles to their intended annular sealing surface being inclined from the vertical to their intended annular sealing surface so said lip has a decided bent with respect to their intended annular sealing surface insuring sealing engagement with the intended annular sealing surface of said conical sealing surface only of said lip, said lip surrounding and radially spaced from and coaxial with said axis and central pin-receiving opening and adapted to be flexed and pressed with only its conical sealing surface in sealing surface engagement with a corresponding and juxtaposed intended sealing surface.

2. The face seal of claim 1 in which a radially central portion of said seal is adapted for load bearing surface engagement with the mating surface of the eye.

3. The face seal of claim 2 in which said axially extending annular lip is compressed and flexed to at least about 85% of its axial extent upon initial engagement of said radially central portion of said seal and the mating surface of the eye.

4. The face seal of claim 2 having an annular area of reduced thickness coaxial with and radially inwardly adjacent said annular lip.

5. The face seal of claim 2 in which the opposite faces of said central portion are parallel and planar and spaced apart axially a distance at least about 15% less than the axial extent of said annular lip.

6. The face seal of claim 1 in which said conical sealing surface is inclined to the axis of said seal in its free state less than about 70°.

7. The face seal of claim 1 in which said conical sealing surface in its free state is angularly related to its intended sealing surface of the eye by an angle of at least about 20°.

8. The face seal of claim 1 in which said annular lip has a continuous groove in its radially outer surface together with a ring of resilient material in said groove urging said lip radially inwardly and into sealing engagement tighter than provided by the flexing and pressing of the lip alone.

9. The face seal of claim 1 in which said non-sealing surface of said lip is cylindrical and coaxial with the axis of said seal.

10. In a pivoting mechanical connection the combination comprising a pin and an eye having a central opening therein to receive said pin and an annular sealing and seal mating surface surrounding said opening, a seal having a central opening to receive said pin, and supporting and retaining means for holding said seal in sealing engagement with said sealing surface, said seal having a radially central portion in load bearing surface engagement with said sealing surface of said eye and a resilient flexible annular lip radially outwardly of and surrounding said central portion, said lip being in resilient sealing engagement with said radially outer portion of said sealing surface of said eye throughout an annular area of engagement provided by the flexing and compression of said lip, said lip in its free state having an annular conical surface extending axially beyond the surface of said central portion and angularly related thereto by at least about 20°, said conical surface providing the only sealing area urged into sealing engagement over an annular area of said annular sealing surface of said eye.

* * * * *